United States Patent
Cammenga et al.

(10) Patent No.: US 10,265,803 B2
(45) Date of Patent: Apr. 23, 2019

(54) ELECTRO-OPTIC ELEMENT WITH ABLATION-FORMED INDICIA AND METHODS FOR MAKING THE SAME

(71) Applicant: Gentex Corporation, Zeeland, MI (US)

(72) Inventors: David J. Cammenga, Zeeland, MI (US); Adam R. Heintzelman, Grand Rapids, MI (US); Kurtis L. Geerlings, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 249 days.

(21) Appl. No.: 14/862,476

(22) Filed: Sep. 23, 2015

(65) Prior Publication Data

US 2016/0085129 A1 Mar. 24, 2016

Related U.S. Application Data

(60) Provisional application No. 62/054,580, filed on Sep. 24, 2014.

(51) Int. Cl.
*G02F 1/153* (2006.01)
*G02F 1/03* (2006.01)
(Continued)

(52) U.S. Cl.
CPC .......... *B23K 26/359* (2015.10); *B23K 26/352* (2015.10); *B60R 1/088* (2013.01);
(Continued)

(58) Field of Classification Search
USPC ............... 359/237, 242, 245–247, 265–267, 359/271–273, 275, 290–292, 295, 298,
(Continued)

(56) References Cited

U.S. PATENT DOCUMENTS

| | | | |
|---|---|---|---|
| 5,189,537 A | 2/1993 | O'Farrell | |
| 6,099,154 A * | 8/2000 | Olney | B60Q 1/2665 362/494 |

(Continued)

FOREIGN PATENT DOCUMENTS

| | | |
|---|---|---|
| AT | 517368 A1 | 1/2017 |
| JP | 2007534981 A | 11/2007 |

(Continued)

OTHER PUBLICATIONS

International Searching Authority, Notification of Transmittal of the International Search Report and Written Opinion re: PCT/US2015/051637, dated Dec. 14, 2015, 9 pages, Moscow, Russia.
(Continued)

*Primary Examiner* — Brandi Thomas
(74) *Attorney, Agent, or Firm* — Price Heneveld LLP; Bradley D. Johnson

(57) ABSTRACT

An electro-optic element is provided that includes a first substrate having a first surface, and a second surface having a first electrically conductive portion disposed thereon. The element also includes a second substrate having a third surface, a fourth surface, and a second electrically conductive portion disposed on at least the third surface. A primary seal is between the second and third surfaces, wherein the seal and the second and third surfaces define a cavity. An electro-optic medium disposed in the cavity. In addition, the second surface further includes at least one indicia disposed thereon between the electro-optic medium and the second surface.

17 Claims, 2 Drawing Sheets

(51) Int. Cl.
  *G02F 1/07* (2006.01)
  *B23K 26/359* (2014.01)
  *B60R 1/08* (2006.01)
  *B23K 26/352* (2014.01)
  *B60R 1/12* (2006.01)
  *E06B 9/24* (2006.01)
  *G02F 1/155* (2006.01)
  *G02F 1/1333* (2006.01)

(52) U.S. Cl.
  CPC .................. *B60R 1/12* (2013.01); *E06B 9/24* (2013.01); *G02F 1/153* (2013.01); *B60R 2001/1215* (2013.01); *E06B 2009/2464* (2013.01); *G02F 1/155* (2013.01); *G02F 2001/133374* (2013.01); *G02F 2203/02* (2013.01)

(58) Field of Classification Search
  USPC .................................................. 359/321, 315
  See application file for complete search history.

(56) References Cited

U.S. PATENT DOCUMENTS

| | | | |
|---|---|---|---|
| 7,738,155 B2 | 6/2010 | Agrawal et al. | |
| 8,169,684 B2 | 5/2012 | Bugno et al. | |
| 2008/0212189 A1* | 9/2008 | Baur | B32B 17/10174 359/604 |
| 2009/0080055 A1 | 3/2009 | Baur et al. | |
| 2009/0201137 A1 | 8/2009 | Weller et al. | |
| 2009/0303566 A1* | 12/2009 | Tonar | B32B 17/06 359/267 |
| 2010/0066519 A1 | 3/2010 | Baur et al. | |
| 2011/0102167 A1 | 5/2011 | Baur et al. | |
| 2011/0168687 A1* | 7/2011 | Door | B60R 1/0602 219/202 |
| 2012/0320444 A1 | 12/2012 | Baur et al. | |
| 2013/0314760 A1 | 11/2013 | Baur et al. | |
| 2014/0055836 A1 | 2/2014 | Cammenga et al. | |
| 2014/0192520 A1* | 7/2014 | Baur | B32B 17/10174 362/135 |
| 2017/0028924 A1 | 2/2017 | Baur et al. | |

FOREIGN PATENT DOCUMENTS

| | | | |
|---|---|---|---|
| KR | 1020070007287 A | 1/2007 | |
| WO | 2006124682 A2 | 11/2006 | |
| WO | 2009026223 A2 | 2/2009 | |

OTHER PUBLICATIONS

European Patent Office; Supplementary European Search Report in Application No. 15845302.7-1914 / 3198335; dated Jul. 6, 2017; 9 pages; Munich, Germany.
Office Action in Korean Patent Application No. 10-2017-7011117; dated Apr. 9, 2018; 8 pages; Korean Intellectual Property Office.
Office Action in Japanese Patent Application No. 2017-516336; dated Apr. 16, 2018; 5 pages; Japanese Patent Office.
Office Action in Japanese Patent Application No. 2017-516336; dated Sep. 18, 2018; 2 pages; Japanese Patent Office.
Office Action in Korean Patent Application No. 10-2017-7011117; dated Sep. 11, 2018; 7 pages; Korean Intellectual Property Office.

* cited by examiner

ELECTRO-OPTIC ELEMENT WITH ABLATION-FORMED INDICIA AND METHODS FOR MAKING THE SAME

CROSS-REFERENCE TO RELATED APPLICATIONS

This application claims the benefit of and priority to U.S. Provisional Patent Application No. 62/054,580, filed on Sep. 24, 2014, entitled "ELECTRO-OPTIC ELEMENT WITH ABLATION-FORMED INDICIA AND METHODS FOR MAKING THE SAME," the entire disclosure of which is hereby incorporated herein by reference.

FIELD

This disclosure generally relates to electro-optic elements and assemblies that can be employed in rearview display devices, variable transmission windows and other applications.

BACKGROUND

Electro-optic elements and assemblies are being used in various vehicular and building applications, e.g., within rearview display devices and variable transmissive windows. Use of these assemblies in various applications can be limited by cost, and aesthetic and functional considerations. Accordingly, new electro-optic element and assembly designs and configurations, along with methods of making them, are needed particularly in view of reducing material and processing costs, improving aesthetics and/or enhancing functionality.

BRIEF SUMMARY

According to one aspect of the disclosure, an electro-optic element is provided that includes a first substrate having a first surface, and a second surface having a first electrically conductive portion disposed thereon. The element also includes a second substrate having a third surface, a fourth surface, and a second electrically conductive portion disposed on at least the third surface. A primary seal is between the second and third surfaces, wherein the seal and the second and third surfaces define a cavity. An electro-optic medium disposed in the cavity. In addition, the second surface further includes at least one indicia disposed thereon between the electro-optic medium and the second surface.

According to another aspect of the disclosure, an electro-optic element is provided that is prepared by a process including the steps of: providing a first substrate having a first surface and a second surface, providing a second substrate comprising a third surface and a fourth surface, forming a first electrically conductive portion over at least a portion of the second surface, and forming a second electrically conductive portion over at least a portion of the third surface. The process also includes the steps of: providing a primary seal between the second surface and the third surface to define a cavity, forming a spectral filter over at least a portion of the second surface and between the second surface and the primary seal, ablating by a laser portions of the spectral filter to define a viewable portion of the electro-optic element and at least one indicia in the viewable portion, and filling the cavity with an electro-optic medium to form an electro-optic element.

According to yet another aspect of the present disclosure, an electro-optic element is provided having a first substrate having a first surface and a second surface, the second surface having a first electrically conductive portion. A second substrate has a third surface and a fourth surface, the third surface having a second electrically conductive portion. A seal is disposed between the second and third surfaces. The seal and the second and third surfaces define a cavity and an electro-optic medium disposed in the cavity. The second surface further includes (i) a spectral filter disposed between the primary seal and the second surface and (ii) at least one indicia disposed thereon between the electro-optic medium and the second surface, the at least one indicia in physical contact with the spectral filter.

In some implementations, the electro-optic element is prepared by a process wherein the step of forming the first electrically conductive portion is performed before the step of forming the spectral filter such that the spectral filter is disposed over the first electrically conductive portion. In certain implementations, the element is prepared by a process wherein the step of forming the first electrically conductive portion is performed after the step of forming the spectral filter such that the first electrically conductive portion is disposed over the spectral filter.

These and other features, advantages, and objects of the present invention will be further understood and appreciated by those skilled in the art by reference to the following specification, claims, and appended drawings.

BRIEF DESCRIPTION OF THE DRAWINGS

The disclosure will become more fully understood from the detailed description and the accompanying drawings, wherein.

DETAILED DESCRIPTION

Figure 1:
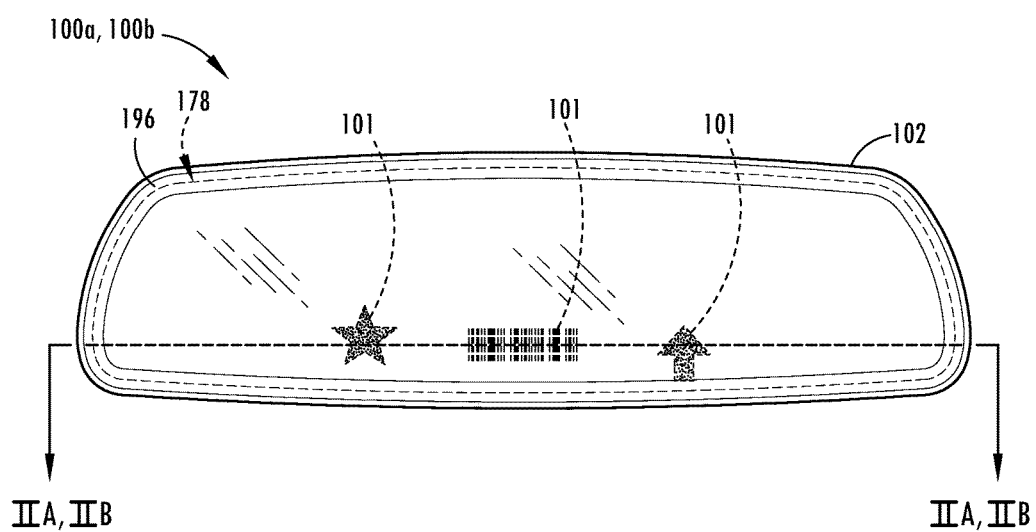
FIG. 1 is a surface plan view of two electro-optic elements, in accordance with aspects of the disclosure.

The present illustrated embodiments reside primarily in combinations of various apparatus components, and methods of making them, related to an electro-optic assembly with a conductive seal. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 2A:
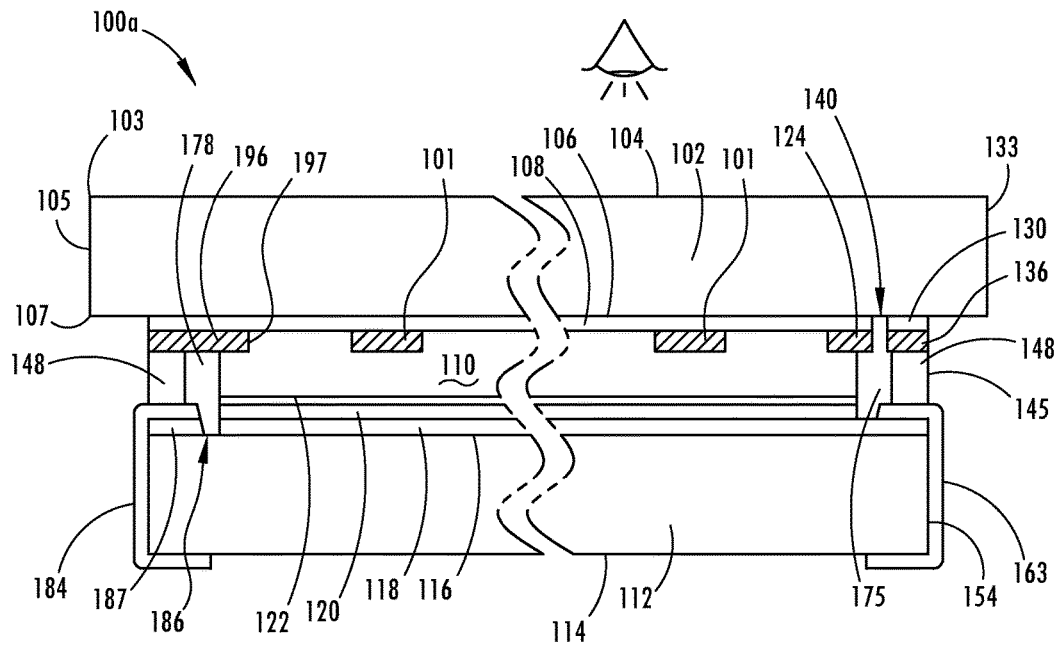
FIG. 2A is a cross-sectional view of one of the elements depicted in FIG. 1, in accordance with an aspect of the disclosure.
Figure 2B:
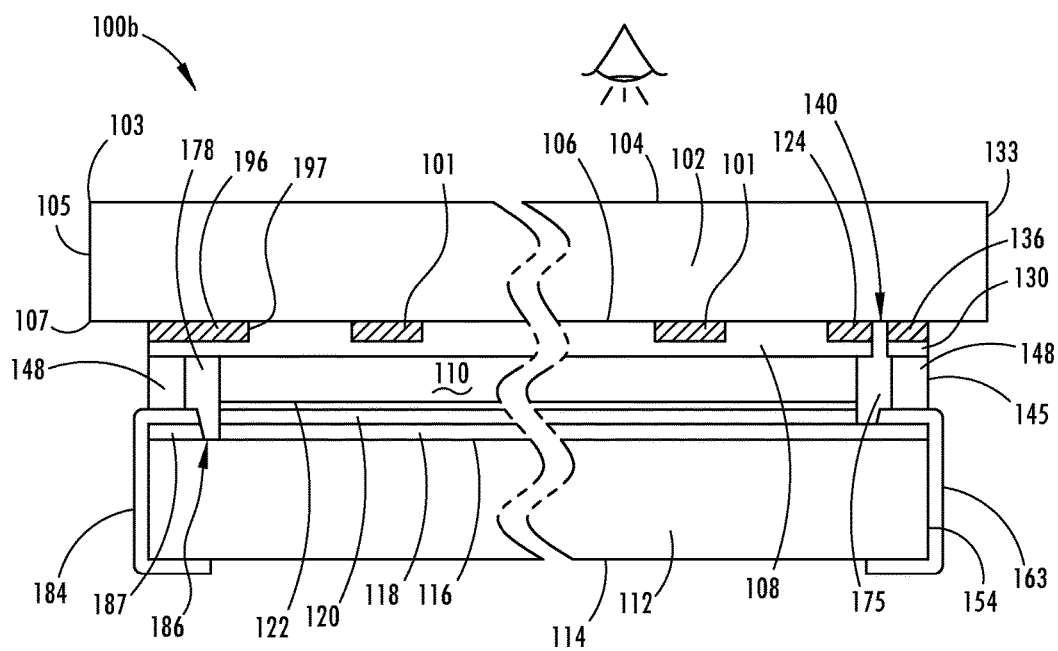
FIG. 2B is a cross-sectional view of the other element depicted in FIG. 1, in accordance with a further aspect of the disclosure.

In reference to FIGS. 1, 2A and 2B, electro-optic elements are generally shown at referenced identifiers 100a, 100b. FIG. 1 depicts electro-optic elements 100a, 100b as viewed toward a first substrate 102 in a plan view with a spectral filter portion 196 positioned between the viewer and a primary seal 178 to obscure or mask the seal 178. In some embodiments, the elements 100a, 100b may not include the spectral filter portion 196. The elements 100a, 100b are also depicted in FIG. 1 with indicia 101 in a viewable portion of the elements. The viewable portion of the elements 100a, 100b substantially includes the area surrounded by the spectral filter portion 196. The indicia 101 are visible when light is transmitted through the elements and when the elements are not being illuminated or backlit. In the depicted embodiment, one indicia 101 (arrow) is in physical contact with, or defined by, the spectral filter portion 196, and two indicia 101 (star and identifier) are not. It should be understood that the electro-optic elements 100a, 100b may include more or less indicia 101 than depicted and that all, none or just a portion of the indicia 101 may be disconnected from the spectral filter portion 196. The primary seal 178, as used herein in this disclosure, may include a plug that is employed after the electro-optic medium 110 is filled within the elements 100a, 100b. Similarly, the elements 100a, 100b can include spectral filter portions 124, 136 that are positioned between the viewer and a primary seal 175 (see FIGS. 2A and 2B). The electro-optic medium 110 can comprise at least one solvent, at least one anodic material, and at least one cathodic material, as understood by those with ordinary skill. In certain aspects, both of the anodic and cathodic materials are electroactive and at least one of them is characterized by an electrochromic oxidation or reduction reaction. In addition, non-conductive and conductive spacing media for controlling the spacing between the laminated substrates may be placed into the primary seal 175, 178 (e.g., before or after the seal material is dispensed within the electro-optic elements 100a, 100b and cured).

FIGS. 2A, 2B depict exemplary electro-optic elements 100a, 100b, respectively, as enlarged cross-sectional views of the elements depicted in FIG. 1 to provide greater detail. The elements 100a, 100b each comprise a first substrate 102 having a first surface 104 and a second surface 106. In most aspects, the substrate 102 is substantially transparent. In one aspect, as depicted in FIGS. 2A and 2B, a first conductive portion 108 and a second conductive portion 130 are applied to the second surface 106 and are substantially electrically insulated from one another via a first isolation area 140. In at least one embodiment, the isolation area 140 can be located such that it is on top of or between the conductive portions 108 and 118 and is electrically isolating, thus preventing conductive portions 108, 118 from being in electrical contact with each other. As such, the first isolation area 140 may be defined or so created with or without removing portions of electrode materials on the second surface 106. It should also be understood that an isolation area 140 and second conductive portion 130 are not necessary in all aspects of this disclosure. For example, the first conductive portion 108 on the one hand, and the conductive material 148 and the first electrical clip 163 on the other, can be arranged such that they are not in electrical contact with each other, obviating the need for isolation area 140. Spectral filter portion 196, and spectral filter portions 124, 136, can also comprise electrically insulating materials to electrically isolate conductive portion 108 from conductive portion 118.

In the exemplary electro-optic elements 100a, 100b depicted in FIGS. 2A and 2B, a portion of the first isolation area 140 is shown to be extending parallel within a portion of the primary seal 175 located near the center thereof. It should be understood that the primary seal 175, as used herein within this disclosure, may also include a plug that is introduced after the electro-optic medium 110 has been introduced within the elements 100a, 100b. This portion of the isolation area 140 may lie such that a viewer would not readily perceive a line between the spectral filter portions 124, 136. For example, a portion of the isolation area 140 may be substantially aligned with an inboard edge of the spectral filter portion 124. It should be understood that when any portion of the isolation area 140 is located inboard of the primary seal 175, a discontinuity in the coloring of the electro-optic medium 110 and/or clearing may be observed. This operational characteristic may be manipulated to derive a subjectively visually appealing element. The isolation area 140 may also be of a dimension smaller than the eye can readily see, e.g., less than 10 µm wide.

Still referring to FIGS. 2A and 2B, the exemplary electro-optic elements 100a, 100b are depicted to comprise a second substrate 112 having a third surface 116 and a fourth surface 114. The first substrate 102 may be larger than the second substrate 112, as depicted in FIGS. 2A and 2B, to create an offset along at least a portion of the perimeter of the assembly. Similarly, the second substrate 112 can be the same size as, or larger than, the first substrate 102. In some aspects, the first substrate 102 can be shaped, (e.g., with an edge having a continuously accurate shape), to hide or mask the second substrate 112, as detailed in U.S. Patent Application Publication No. 2014/0055836, which is hereby incorporated herein in its entirety by reference within this application.

Further, certain applications of the exemplary electro-optic elements 100a, 100b may desirably have a substantially transparent second substrate 112, such as window applications. Third and fourth conductive portions 118, 187, respectively, are shown proximate to the third surface 116 and substantially electrically insulated via second isolation area 186. A portion of the second isolation area 186 is shown to be extending parallel within a portion of the primary seal 178 located near the center thereof. Further, this portion of the second isolation area 186 may lie such that a viewer would not readily perceive a line within the spectral filter material. For example, a portion of the second isolation area 186 may be substantially aligned with an inboard edge 197 of the spectral filter portion 196. In some implementations, the isolation area 186 may extend to the outbound edge of the second substrate 112 in such a way as to eliminate the fourth conductive portion 187. In other implementations, a second isolation area 186 and a fourth conductive portion 187 may not be present. For example, the third conductive portion 118 on the one hand, and the conductive material 148 and the second electrical clip 184 on the other, can be arranged such that they are not in electrical contact with each other, obviating the need for the second isolation area 186. As further shown in FIGS. 2A and 2B, an optional reflective material 120 may be applied between an overcoat 122 (also optional) and the third conductive portion 118.

With further reference to the exemplary electro-optic elements 100a, 100b depicted in FIGS. 2A and 2B, the first isolation area 140 cooperates with a portion of the primary seal 175 to define the second conductive portion 130 and the second spectral filter material portion 136, each substantially electrically insulated from the first conductive portion 108 and the first spectral filter portion 124. This configuration allows for placement of a conductive material 148 (e.g., a silver-containing conductive epoxy) adjacent to the primary seal 175 such that the first electrical clip 163, which is in contact with the primary seal 175, is further in electrical communication with the conductive material 148, the third conductive portion 118, the second conductive portion 130, and the electro-optic medium 110. Preferably, the material, or composition of materials, forming the third conductive portion 118 and the conductive material 148 are chosen to promote durable electrical communication between the clip 163 and the materials leading to the electro-optic medium 110.

Referring again to FIGS. 2A and 2B, the second isolation area 186 of the exemplary electro-optic elements 100a, 100b cooperate with a portion of the primary seal 178 to define the fourth conductive portion 187 (if present) that is substantially electrically insulated from the third conductive portion 118, the reflective layer 120, the optional overcoat 122 and the electro-optic medium 110. This configuration allows for placement of a conductive material 148 adjacent to the primary seal 178 such that second electrical clip 184 is in electrical communication with the conductive material 148, the first spectral filter portion 124, the first conductive portion 108 and the electro-optic medium 110. Preferably, the material, or composition of materials, forming the conductive material 148 and the first conductive portion 108, are chosen to promote durable electrical communication between the clip 184 and the materials leading to the electro-optic medium 110.

According to one aspect of the disclosure, electro-optic elements 100a, 100b, as depicted in exemplary form in FIGS. 2A and 2B, are provided that include a first substrate 102 comprising a first surface 104, and a second surface 106 comprising a plurality of electrically conductive portions 108, 130 disposed thereon. In certain aspects, portions 108, 130 are substantially isolated from one another by an isolation area 140. The isolation area 140 is substantially devoid of electrically conductive material in certain aspects. The elements 100a, 100b also include a second substrate 112 comprising a third surface 116, a fourth surface 114, and a conductive portion 118 disposed on at least the third surface 116. A conductive portion 187 may also be disposed on the third surface 116 in some implementations. The electro-optic elements 100a, 100b also include primary seal 175, 178 portions between the second and third surfaces 106, 116, respectively, wherein the seals 175, 178 and the second and third surfaces 106, 116 define a cavity. The elements 100a, 100b further include an electro-optic medium 110 disposed in the cavity. In addition, the second surface 106 further comprises a spectral filter disposed thereon and between the portions of the primary seal 175, 178 and the second surface 106. In certain aspects, the spectral filter can comprise a first and a second spectral filter portion 124, 136, respectively, that are substantially isolated from one another by the isolation area 140, along with a spectral filter portion 196 over the primary seal 178. The second surface 106 also comprises at least one indicia 101 disposed thereon between the electro-optic medium 110 and the second surface 106.

In these aspects of the electro-optic elements 100a, 100b depicted in FIGS. 2A and 2B, the spectral filter portions 124, 136 are comprised of materials and/or dimensionally configured to obscure or mask at least portions of the primary seal 175 and the conductive material 148 from a viewer (as denoted by an eye symbol). Similarly, the spectral filter portion 196 is comprised of a material and/or dimensionally configured to obscure or mask at least portions of the primary seal 178 and conductive material 148 from a viewer. Accordingly, spectral filter portions 124, 136 and 196 can be fabricated or otherwise contain opaque or mirror-like constituents (e.g., chrome-containing coatings, lustrous metals or other mirror-like coatings) with low optical transmissivity.

Still further, the exemplary electro-optic elements 100a, 100b, according to these aspects, also contain one or more indicia 101 disposed on the second surface 106. More particularly, the indicia 101 are located between the second surface 106 and the electro-optic medium 110. Like the spectral filter portions 124, 136 and 196, the indicia 101 can be fabricated or otherwise contain opaque or mirror-like constituents with low optical transmissivity. In some implementations, the material employed to form the indicia 101 can be similar to or the same as the material employed in the spectral filter portions 124, 136 and 196. According to particular embodiments, the indicia 101 may be configured in one or more shapes (e.g., stars, icons and other symbols) that are visible to a viewer when the regions of the elements 100a, 100b not containing the indicia 101, and the spectral filter portions 124, 136 and 196, are illuminated or are otherwise passing visible light toward the viewer. Indicia 101 may also be viewed when the elements 100a, 100b are not backlit or otherwise illuminated. The indicia 101 may also be configured as one or more identifiers (e.g., a 1 dimensional barcode, a two dimensional barcode, a QR code, other forms of machine-readable codes, logotype, graphic, emblem, or text) which indicate data (e.g., part number, lot number, part type, manufacturer, model) related to the electro-optic elements 100a, 100b. The indicia 101, in identifier embodiments, may be small or thin enough such that the identifier indicia 101 is not perceptible or is not readily noticeable by a human eye. Although depicted as located between the electro-optic medium 110 and the first electrically conductive portion 108, in various embodiments the indicia 101 of the spectral filter portions 124, 136 and 196 may be located directly on the second surface 106, between the second surface 106 and the first electrically conductive portion 108.

According to a further aspect of the disclosure, electro-optic elements 100a, 100b are provided that can be prepared by a process that includes laser ablation steps for patterning portions of the spectral filter and electrically conductive portions (e.g., electrically conductive coatings or electrodes) to define isolation areas and indicia. In one such method, elements 100a, 100b can be fabricated according to the steps: (a) providing a first substrate 102 comprising a first surface 104 and a second surface 106; (b) providing a second substrate 112 comprising a third surface 116 and a fourth surface 114; (c) forming a first electrically conductive portion, e.g., portion 108 (and portion 130, if present), over at least a portion of the second surface 106; and (d) forming a second electrically conductive portion, e.g., portion 118 (and portion 187, if present), over at least a portion of the third surface 116. The process for electro-optic elements 100a, 100b also includes the steps: (e) forming a spectral filter over at least a portion of the second surface 106; (f) ablating by a laser portions of the spectral filter to define a viewable portion of the electro-optic element and at least one indicia 101 in the viewable portion; (g) providing portions of a primary seal 175, 178 between the second surface 106 and the third surface 116 to define a cavity (e.g., by affixing the seal 175, 178 to the second surface 106 and the third surface 116 to define the cavity); and (h) filling the cavity with an electro-optic medium 110 to form the electro-optic elements 100a, 100b. The method may optionally include a step for ablating by a laser portions of the spectral filter and the first electrically conductive portion to form an isolation area 140 that defines respective first and second portions of the first electrically conductive portion 108, 130 and the spectral filter 124, 136 that are substantially electrically isolated from each other.

With particular regard to the electro-optic element 100a depicted in FIG. 2A, this element can be prepared by a process wherein the step of forming the first electrically conductive portion 108 is performed before the step of forming the spectral filter such that the spectral filter is disposed over the first electrically conductive portion. Accordingly, the first electrically conductive portion is disposed directly on or over the second surface 106 of the first substrate 102, and between the second surface 106 and the spectral filter portions 124, 136, 196 and the indicia 101. One or more laser ablation steps can be employed after the steps for forming the first electrically conductive portion and spectral filter portions to form and define the spectral filter portions 124, 136, 196, the indicia 101 and the electrically conductive portions 108, 130. As such, the steps for forming the first electrically conductive portion and the spectral filter can form continuous or substantially continuous coatings, films or layers that are subsequently ablated to form or otherwise define the spectral filter portions 124, 136, 196, the indicia 101, and the electrically conductive portions 108, 130.

Referring to FIG. 2B, the electro-optic element 100b can be prepared by a process wherein the step for forming the first electrically conductive portion is performed after the step of forming the spectral filter such that the first electrically conductive portion is disposed over the spectral filter such that the first electrically conductive portion encapsulates at least a portion of one of the spectral filter portions 124, 136, 196. Accordingly, the spectral filter portions 124, 136, 196 and the indicia 101 are disposed directly on or over the second surface 106 of the first substrate 102, and between the second surface 106 and the electrically conductive portions 108, 130. One or more laser ablation steps can be employed to ablate the spectral filter to form the indicia 101 and spectral filter portion 196. Next, the first electrically conductive portion 108 can be applied over the indicia 101, the spectral filter portion 196, and the remaining, un-ablated portions of the spectral filter (e.g., portions of the spectral filter that will subsequently become spectral filter portions 124, 136). At this point, another laser ablation step can be conducted, according to some aspects, to form the isolation area 140 to define and electrically isolate the respective spectral filter portions 124, 136 and electrically conductive portions 108, 130.

The foregoing methods employed to fabricate the electro-optic elements 100a, 100b depicted in FIGS. 2A and 2B possess particular advantages. An advantage of the method employed to fabricate element 100a and its particular configuration, as shown in FIG. 2A, is that only one ablation step may be necessary to form the spectral filter (e.g., spectral filter portions 124, 136, 196), indicia 101 and isolation area 140 (if present). Further, relatively simple steps for forming the interim spectral filter and the first electrically conductive portion or portions over the second surface 106 can be conducted without patterning or limited patterning steps. Accordingly, the element 100a possesses a configuration amenable to low-cost manufacturing approaches.

With respect to the foregoing method for making the electro-optic element 100b, and its particular configuration as depicted in FIG. 2B, the method offers advantages in terms of managing material compatibility issues between the spectral filter portions and the electro-optic medium 110. In particular, the spectral filter portions 124, 136, 196 and indicia 101 are effectively isolated from the electro-optic medium 110 by the electrically conductive portions 108, 130. As such, particular materials can be employed in the spectral filter portions and/or indicia that would otherwise not be compatible with the electro-optic medium 110 (e.g., in terms of corrosion resistance, propensity to generate reaction products, cause segregation of the electro-optic medium 110, etc.). It will be understood that in embodiments where the indicia 101 and the spectral filter portions 124, 136 and 196 are located directly on the second surface 106, formation of the indicia 101 via ablation may take place prior to deposition of the first electrically conductive layer 108.

Notwithstanding the particular arrangements and sequences recited herein, the laser ablation equipment and techniques employed according to the disclosure are within the understanding of those with ordinary skill in the field. Similarly, the particular materials employed for the spectral filter portions, indicia and electrically conductive portions are to be tailored to the designated application for the electro-optic elements 100a, 100b. For example, transparent electrode materials (e.g., transparent conductive oxides including but not limited to indium tin oxide compositions) can be employed in the electrically conductive portions of the electro-optic elements 100a, 100b that are configured for use in rearview optical devices. It should also be understood that the spectral filter portions 124, 136, 196, and the indicia 101, can comprise a single coating material, multiple coatings and other stack structures and assemblies. As such, various coating materials and structures can be selected to optimize the desired optical-masking characteristics (e.g., for spectral filter portions 124, 136 and/or 196) and aesthetics (e.g., for indicia 101) in view of coating adhesion to the second surface 106 of the substrate 101 and/or the first electrically conductive portion (e.g., portions 108, 130). Other considerations that can impact the particular configuration selected for the spectral filter portions and the indicia include amenability to large-area, laser ablation manufacturing processes.

It should be appreciated by those skilled in the art that the electro-optic elements 100a, 100b, and the devices and assemblies otherwise incorporating them, can have additional or alternative advantages. Similarly, it should also be appreciated by those with ordinary skill that the methods outlined herein for making the electro-optic elements and assemblies can likewise have additional or alternative advantages. It should further be appreciated by those skilled in the art that the above-described components can be combined in additional or alternative ways not explicitly described herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electro-optic element, comprising:
a first substrate comprising:

a first surface, and
a second surface comprising a first electrically conductive portion disposed thereon;
a second substrate comprising:
a third surface,
a fourth surface, and
a second electrically conductive portion disposed on at least the third surface;
a primary seal between the second and the third surfaces, wherein the seal and the second and the third surfaces define a cavity;
an electro-optic medium disposed in the cavity; and
a spectral filter portion positioned on the second surface, wherein the second surface further comprises at least one indicia disposed thereon between the electro-optic medium and the second surface, and
wherein the first electrically conductive portion is positioned between the indicia and the second surface, and
further wherein the spectral filter portion and the indicia comprise the same material and the spectral filter portion defines a perimeter of a viewable portion of the element.

2. The electro-optic element of claim 1, wherein the at least one indicia is a barcode indicia.

3. The electro-optic element of claim 1, wherein the indicia is at least partially connected to the spectral filter.

4. The electro-optic element of claim 1, further comprising:
at least two indicia, wherein the first conductive portion is disposed between the at least two indicia.

5. An electro-optic element prepared by a process comprising the steps: providing a first substrate comprising a first surface and a second surface; providing a second substrate comprising a third surface and a fourth surface; forming a first electrically conductive portion on at least a portion of the second surface; forming a second electrically conductive portion on at least a portion of the third surface; forming a spectral filter on at least a portion of the second surface; ablating by a laser portions of the spectral filter to define a perimeter of a viewable portion of the electro-optic element and at least one indicia in the viewable portion; providing a primary seal between the second surface and the third surface to define a cavity; and filling the cavity with an electro-optic medium to form an electro-optic element, wherein the second surface further comprises at least one indicia disposed thereon between the electro-optic medium and the second surface, wherein the first electrically conductive portion is positioned between the indicia and the second surface, and further wherein the spectral filter portion and the indicia comprise the same material.

6. The electro-optic element prepared by the process according to claim 5, wherein the step of forming the first electrically conductive portion is performed before the step of forming the spectral filter such that the spectral filter is disposed over the first electrically conductive portion.

7. The electro-optic element prepared by the process according to claim 5, wherein the step of forming the first electrically conductive portion is performed after the step of forming the spectral filter such that the first electrically conductive portion is disposed over the spectral filter.

8. The electro-optic element prepared by the process according to claim 7, wherein the indicia is substantially encapsulated by the first electrically conductive portion and the second surface.

9. The electro-optic element prepared by the process according to claim 5, wherein the spectral filter and the indicia each comprise a metal.

10. The electro-optic element prepared by the process according to claim 9, wherein the indicia is at least partially connected to the spectral filter.

11. The electro-optic element prepared by the process according to claim 5, further comprising:
at least two indicia, wherein a portion of the first conductive portion is disposed between the at least two indicia.

12. An electro-optic element, comprising:
a first substrate having a first surface and a second surface, the second surface comprising a first electrically conductive portion;
a second substrate having a third surface and a fourth surface, the third surface comprising a second electrically conductive portion;
a seal disposed between the second and the third surfaces, wherein the seal and the second and the third surfaces define a cavity; and
an electro-optic medium disposed in the cavity,
wherein the second surface further comprises (i) a spectral filter disposed between a primary seal and the second surface; and (ii) at least one indicia disposed thereon between the electro-optic medium and the second surface, the at least one indicia in physical contact with the spectral filter.

13. The electro-optic element of claim 12, wherein the spectral filter and the indicia comprise the same material.

14. The electro-optic element of claim 13, wherein the indicia is positioned between the second surface and the first electrically conductive portion.

15. The electro-optic element of claim 12, further comprising:
at least two indicia, wherein the electro-optic medium is disposed between the at least two indicia.

16. The electro-optic element of claim 12, wherein the first electrically conductive portion is positioned between the indicia and the second surface.

17. The electro-optic element of claim 12, further comprising:
at least two indicia, wherein at least one indicia is in physical contact with the spectral filter and the at least one indicia is not in contact with the spectral filter.

* * * * *